United States Patent [19]

Negishi

[11] Patent Number: 4,807,975
[45] Date of Patent: Feb. 28, 1989

[54] IMAGE FORMING SYSTEM HAVING UNIFORM ILLUMINATION FLUX FOR LIQUID CRYSTAL IMAGE MEANS

[76] Inventor: Masataka Negishi, 29-19, Daito 2-chome, Urawa-shi, Saitama-ken, Japan

[21] Appl. No.: 2,654
[22] PCT Filed: Apr. 17, 1985
[86] PCT No.: PCT/JP85/00210
§ 371 Date: Dec. 16, 1986
§ 102(e) Date: Dec. 16, 1986
[87] PCT Pub. No.: WO86/06237
PCT Pub. Date: Oct. 23, 1986
[51] Int. Cl.$^4$ ............................................. G02F 1/13
[52] U.S. Cl. ............................. 350/345; 350/331 R; 350/333; 358/59
[58] Field of Search ............... 350/331 R, 345, 333; 358/59

[56] References Cited

U.S. PATENT DOCUMENTS

| | | | |
|---|---|---|---|
| 3,520,589 | 7/1970 | Angel et al. | 350/385 |
| 3,592,592 | 7/1971 | Schmidt | 358/62 |
| 3,704,936 | 12/1972 | Gorkiewicz et al. | 350/361 |
| 3,723,651 | 3/1973 | Gorog | 178/7.5 D |
| 4,090,219 | 5/1978 | Ernstoff et al. | 358/59 |
| 4,222,641 | 9/1980 | Stolov | 350/331 R X |
| 4,368,963 | 1/1983 | Stolov | 350/331 R X |
| 4,510,560 | 4/1985 | Negishi | 362/299 |
| 4,613,207 | 9/1986 | Fergason | 350/331 R X |
| 4,659,183 | 4/1987 | Suzawa | 350/345 |
| 4,704,004 | 11/1987 | Nosker | 350/345 |

FOREIGN PATENT DOCUMENTS

| | | |
|---|---|---|
| 47-10445 | 3/1946 | Japan . |
| 28-561 | 8/1949 | Japan . |
| 51-58821 | 5/1976 | Japan . |
| 52-1280 | 1/1977 | Japan . |
| 53-17017 | 6/1978 | Japan . |
| 56-149868 | 11/1981 | Japan . |

Primary Examiner—Stanley D. Miller
Assistant Examiner—Richard Gallivan
Attorney, Agent, or Firm—Ladas & Parry

[57] ABSTRACT

A light source is disposed and spaced apart from a display surface and the light from the light source is changed into the light rays having a substantially uniform distribution of luminous flux density by a light control device such as a mirror having a specially designed configuration before the light reaches the display surface. An image generation device such as a transmission type liquid crystal image generation device is inserted in the path of the light rays having a substantially uniform distribution of luminous flux density, and the such light rays transmitted through the image generation device forms an image on the display surface with uniform intensity of illumination. In order to form a color image, three optical systems as above corresponding to the three red, green and blue primary colors are provided and the lights from the three primary color light sources are transmitted with a time difference to an image generation device. In synchronism with this transmission, the three primary color image signals are sequentially transmitted to the image generation device, whereby a color image is formed by the color sequence process. When the above optical systems are provided for respective primary colors and three primary color image signals are synchronously applied to three image generation devices, a color image is formed by the additive process. The above-described color image formation systems can attain a high degree of convergence.

10 Claims, 7 Drawing Sheets

IMAGE FORMING SYSTEM HAVING UNIFORM ILLUMINATION FLUX FOR LIQUID CRYSTAL IMAGE MEANS

TECHNICAL FIELD

The present invention relates to an image forming system such as a display device, television, or the like.

BACKGROUND ART

Image foring systems are known in which a light source is disposed behind an optically transparent display surface and an image generation device is interposed between the light source and the display surface and in which a display surface is a screen upon which is projected the light emitted from a light source with an image generating device interposed between the screen and the light source. One example of the former type is a liquid crystal television set while one example of the latter type is a projection type television set. These prior art image forming systems have the following problems.

In the case of the former type, the light source disposed behind the display surface is a point or line light source so that non-uniform illumination occurs on the screen. This non-uniform illumination cannot be completely eliminated even by increasing the number of light sources in accordance with the size of the screen. The non-uniform illumination makes poor the quality of the image formed on the liquid crystal television display surface, especially in the case of the liquid crystal color televisions, non-uniform illumination affects the quality of the color obtained by mixing three primary colors regardless of the sequence process or the additive process.

In the case of the latter type, the light source must be disposed in direct opposed relationship with the center of the screen so that the image generation device must be disposed in substantially directly opposed relationship with the center of the screen since it is disposed between the light source and the screen. As a result, a projector mainbody is located at a position in opposed or confronting relationship with the screen, thereby adversely affecting the viewing of the screen and also causing non-uniform illuminatin as in the case of the former type. Furthermore, when the latter type is used for the formation of a color image, it is impossible theoretically to cause the same picture elements of an image to be projected on the screen to converge through the image generation devices of three primary colors at one point unless a control means capable of detecting deviations and feeding back the detected deviations is provided.

In other words, it is in general impossible to obtain color convergence. Especially when conventional lenses are used in an optical system, every optical aberration occurs around the optical axis. In the case of a system in which three primary colors must be projected onto a screen by using respective optical axes, the convergence of three colors cannot be obtained because of aberrations even when the degree of precision of every part is improved.

In view of the above, the present invention has for its object to provide an image formation system which can primarily solve the non-uniformity of illumination on the display surface and the problem of the position at which an image generation device is placed.

Furthermore, the present invention has an object to provide an image forming system which can substantially solve the above-described problems in the case of the formation of color images.

SUMMARY OF THE INVENTION

An image forming system in accordance with the present invention comprises a display surface, a light source disposed at a position spaced apart from the display surface, a light control device disposed in the light path to control the light from the light source in such a manner that the light from the light source is so controlled that the light will reach the display surface substantially with a uniform luminous flux density distribution, and an image generating device interposed between the light control device and the display surface and having light tramsmssion quantity varying elemental portions each corresponding to each picture element of an image to be formed, each elemental portion individually controlling the light transmission quantity in response to a signal.

According to an aspect of the present invention, the image forming system comprises a display surface, three red, green and blue light sources disposed in spaced apart relationships with the display surface, three light control devices each of which is disposed in the path of light emitted from each light sorce so as to control the light emitted from each light source in such a manner that the light can reach the display surface substantially with a uniform lumuinous flux density distribution, an image generation device disposed adjacent to the display surface on the side of the light sources thereof and having light transmission varying elemental portions each corresponding to each picture element of an image to be formed, three primary color switching devices for sequentially transmitting the lights from the three primary color light sources with a time difference, a video signal input device for transmiting video signals in three primary colors to said elemental portions of the image generation device with a time difference, thereby controlling the quantity of light transmitted through each elemental portion, and a synchronizing device for synchronizing the three primary color switches devices with said video signal input device with respect to colors.

According to another aspect of the present invention, the image forming system comprises a display surface, three red, blue and green light sources disposed in spaced apart relationships with the display surface, light control devices each of which is disposed in the path of light emitted from each light source in such a manner as to cause the light to reach the dispaly surface substantially with a uniform luminous flux density distribution, three image formation devices interposed between the light sources and the display surface and having light transmission quantity varying elemental portions each corresponding to a picture element of an image to be formed so that the images generated by the three image generation devices are superimposed one upon another on the display surface, and a video signal input device connected to each of the image generation devices for inputting individually and synchronously three primary color video signals.

BEST MODES FOR CARRYING OUT THE INVENTION

Embodiment of the present invention will be described in detail with reference to the accompanying drawings.

Figure 1:
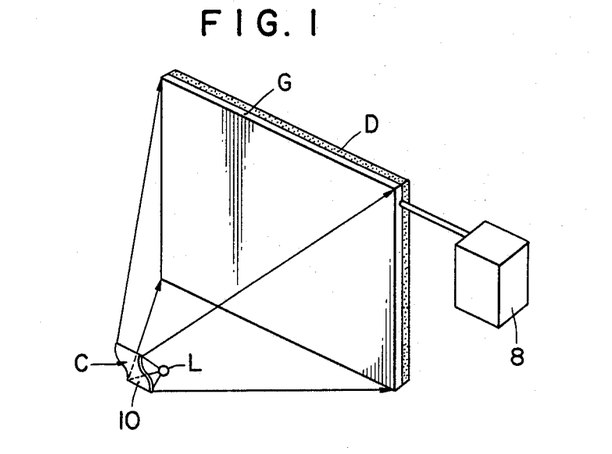
FIG. 1 is a perspective view of a monochromatic color image forming system in accordance with the present invention.
Figure 2:
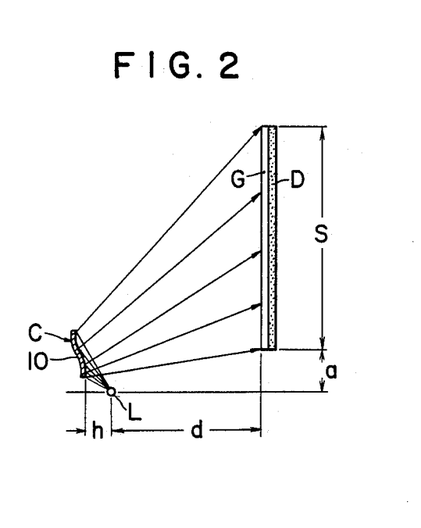
FIG. 2 is a side view thereof.

FIGS. 1 and 2 show the simplest form of the image forming system in accordance with the present invention. In FIGS. 1 and 2, D represents a display surface upon which is formed an image; L, a light source; C, a control device for controlling the light emitted from the light source L; and G, an image generation device. In this simplest form, the light source L is a point light source and the light emitted therefrom is reflected by the light control device C, which is in the form of a reflecting mirror, and directed toward the display surface D. The image generation device G is disposed across the path of the light from the control device C to the display surface D whereby only the light rays which are passed or transmitted through the image generation device G reach the display surface D.

The image generation device G has elemental portions for varying light quantity to be transmitted therethrough, each corresponding to each picture element of an image, and therefore when only some specific elemental portions are opened to permit the transmission of light, an image corresponding to a pattern defined by the opened elemental portions is displayed on the display surface by the light incident on the display surface. In the most fundamental form, the elemental portions consist of windows which are opened or closed. The image formed on the display surface D is viewed from the side opposite to the image generation device G. An arbiary pattern can be easily formed on the display surface by carrying out opening and closing operation of the eleental portions in response to operation signals. The display surface is formed from a light diffusion material such as a frosted glass plate.

According to the present invention, the light control device C which transmits the light to the display surface in order to form an image thereof is so designed and constructed that the light rays from the light source L are so controlled that they reach the display surface substantially with a uniform luminous flux density distribution. In other words, the light control device C is so designed and constructed that the distribution of the luminous flux density would be uniform over the display surface if the image generation device G were not provided. The light control device C will be described in detail hereinafter.

Figure 3:
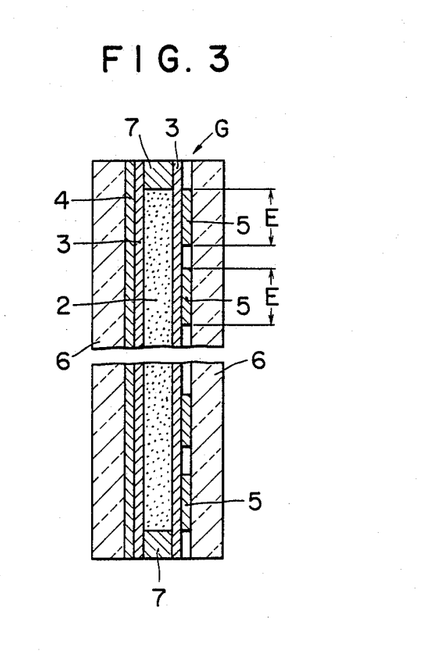
FIG. 3 is a sectional view, on enlarged scale, of a liquid crystal image forming device.

The most practical example of the image generation device G is a liquid crystal (LC) type image generation device, but, an electrochromic display type image generation device (ECD) can also be used. The underlying principle of the liquid crystal type image generation device G is shown in FIG. 3, in which 2 denotes a liquid crystal; 3, a molecular orientation layer; 4 and 5, transparent electrodes; 6, glass substrates; and 7, a sealing member. One transparent electrode 5 comprises miniature electrodes arranged in the form of a grid over the whole surface of the image generation device G and a voltage between each miniature electrode and the other electrode 4 can be varied as desired. The region of each miniature electrode 5 defines each light quantity varying elemental portion E. As is well known in the art, depending upon the voltage between a specific miniature electrode 5 and the opposing electrode 4, the quantity of light transmitted through the liquid crystal belonging to the elemental portion E corresponding to the miniature electrode changes. Therefore, when video signals are applied to respective transparent elctrodes 5 by, for example, an image scanning signal input device 8 as shown in FIG. 1, an image is produced in the image generation device G and appears on the display surface D by light rays from the light control device C. Of course, both moving and still images can be displayed.

Figure 4:
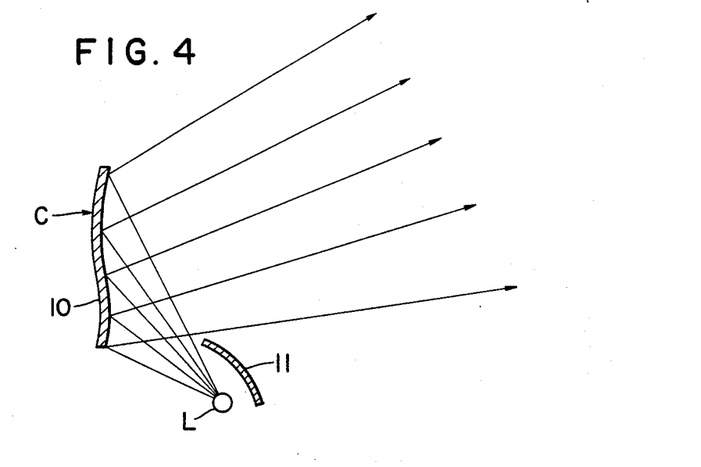
FIGS. 4, 5, 6 and 7 are sectional views of different light control devices, respectively.

The light control device C may have various constructions. An example of the light control device in the form of a reflecting mirror 10 is shown in FIGS. 1, 2 and 4. The reflecting mirror 10 directs light rays emitted from the point light source L toward the display surface D, and the shape of the mirror surface is so designed that the reflected luminous flux reaches the display surface with a uniform distribution of density. In the case of the mirror surface shown, it has such a shape that the reflected luminous flux is diverged both in the vertical and horizontal directions. When the relative positions and dimensions of the light source L, the reflecting mirror 10 and the display surface D as well as light ray distribution characteristics are determined, the three-dimensional configuration of the mirror surface can be given exactly by a computer analysis. In designing the shape of the mirror face, the constants such a h, d, a and s as shown in FIG. 2 must be determined. As shown in FIG. 4, a light shielding plate 11 is provided to ensure that the light from the light source L will not reach the display surface D directly.

Figure 5:
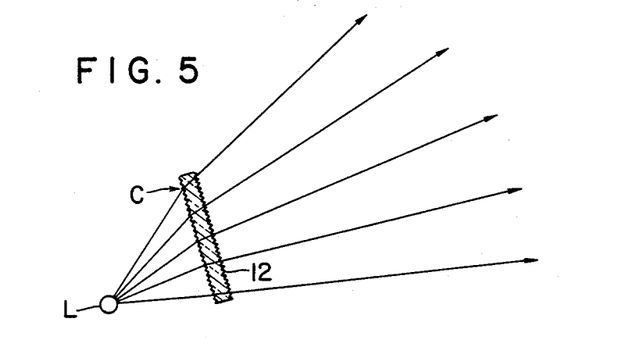

Instead of the reflecting mirror, the light control device C may be in the form of a Fresnel plate 12 as shown in FIG. 5. The Fresnel plate 12 comprises a transparent plate having sawtooth-shaped ridges formed on one or both surfaces thereof, and when the pitch of the sawtooth-shaped ridges and the angle of inclination thereof are suitably selected, the light can be caused to reach the display surface D with a uniform distribution of luminous flux density. When the Fresnel plate 12 is used, it is preferable to use a line light source extending perpendicular to the sheet surface of FIG. 5.

Figure 6:
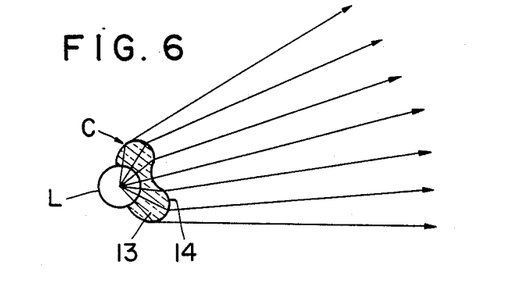

FIG. 6 shows a further example of the light control device C. In this example, a lens 13 having a special configuration is provided in contact with the light source L. The lens 13 has such a cross sectional configuration that the center portion 14 of its surface remote form the light source L is recesed and the lateral end portions are curved and expanded. The configuration of the lens 13 can also be determined exactly by a computer analysis.

Figure 7:
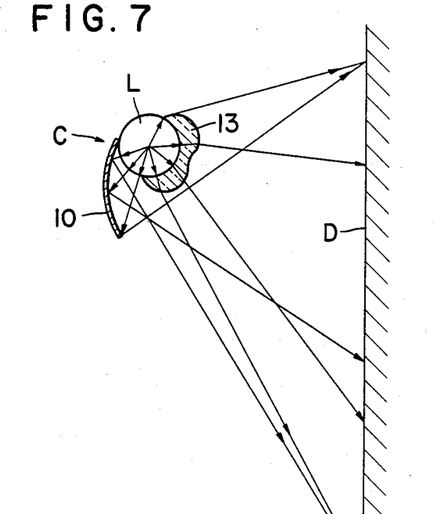

In the case of the light control device C shown in FIG. 7, both a reflecting mirror 10 and a specially designed lens 13 similar to that shown in FIG. 6 are used. The reflecting mirror 10 is disposed on the side of the light source L opposite to the display surface D and reflects the light from the light source L toward the dispaly surface D with a uniform distribution of luminous flux density. The lens 13 is disposed on the side of the light source L facing the display surface D and transmits the light from the light source L to the display surface D with a uniform distribution of luminous flux density. In this example, the light from the light source is effectively utilized.

The above-described embodiment is a system for forming monochromatic color image. Monochromatic color image forming devices (for example, a monochromatic color television set) of the type in which the image generation device (for instance, a liquid crystal type image generation device) is interposed between the light source and the display surface have been well known in the art, but in such image forming devices, the light rays projected from the light source to the display surface do not have a completely controlled uniform distribution of luminous flux density. Of course, such devices are designed and constructed to ensure that the light reaches the display surface with as uniform distribution of luminous flux density as possible, but illumination is brightest at a portion which is closest to the light source while the illumination is darkest in the portion which is most remote from the light source. This tendency is enhanced as the display surface is increased in size and cannot be eliminated even when the number of light sources is increased. The present invention can solve this problem.

The advantageous features of the present invention are further enhanced when it is applied to color image forming devices. The embodiments of the color image forming device will now be described below.

Figure 8:
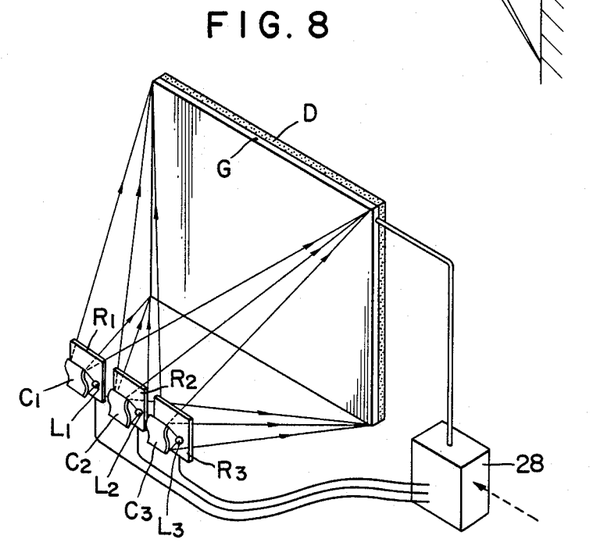
FIG. 8 is a perspective view of a color image forming system based on the underlying principle of the embodiment shown in FIG. 1.

In FIG. 8, D and G represent the display surface and the image generation device, respectively, as in the case of FIG. 1. Typically, the image generation device G is a monochromatic color image generation device which is similar in construction and mode of operation to the device as shown in FIG. 3. As in the case of FIG. 1, the display surface D is a light diffusion plate or a light diffusion layer. In this embodiment, in order to form a color image, three light sources $L_1$, $L_2$ and $L_3$ of the colors of red, green and blue, respectively, are used and three light control devices, $C_1$, $C_2$ and $C_3$ are additionally provided. The light emitted from the light source $L_1$, $L_2$ or $L_3$ is transmitted through the image generation device G under the control of the light control device $C_1$, $C_2$ or $C_3$. Of course, any of the light control devices described hereinbefore can be used as the light control device, but in FIG. 8 the light control device C consists of a reflecting mirror. The light control devices $C_1$, $C_2$ and $C_3$ serve to cause the light rays from the light sources $C_1$, $C_2$ $_L$ $_{and}$ $C_3$ to reach the display surface D with a uniform distribution of luminous flux density.

In this embodiment, three primary color switching devices $R_1$, $R_2$ and $R_3$ are disposed in the light paths from the light control devices $C_1$, $C_2$ and $C_3$, respectively, and each of the elements R1, R2 and R3 of these switching devices is a sort of an optical shutter device and can be switched between a light transmission state and a light interruption state independently of each other. In principle, the elements $R_1$, $R_2$ and $R_3$ may be in general a mechanical shutter, but in practice it is preferable to use a liquid crystal type shutter.

Figure 9:
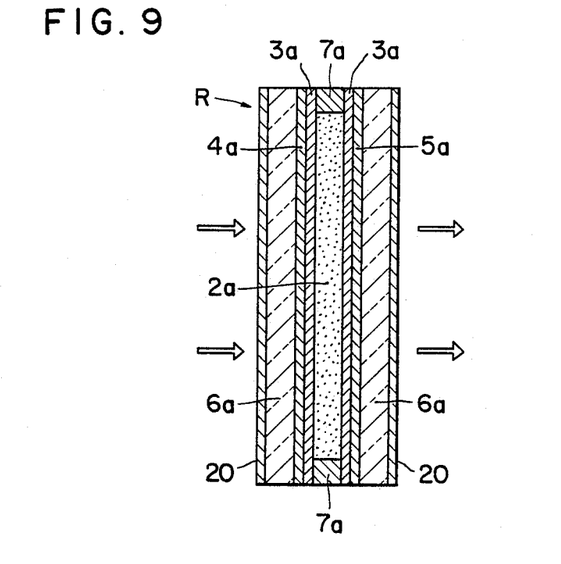
FIG. 9 is a section view of a liquid crystal shutter device.

One example is shown in FIG. 9.

In principle, the liquid crystal type shutter R shown is similar to that shown in FIG. 3. A liquid crystal 2a is sealed between molecular orientation layers 3a and sealed with a sealing member 7a, and transparent electrodes 4a and 5a are joined to the outer surfaces of the molecular orientation layers 3a, respectively. Furthermore, glass substrates 6a are joined to the transparent electrodes 4a and 5a, respectively. Furthermore, polarizers 20 are joined to the outer surfaces of the glass substrates 6a, respectively.

In the case of the liquid-crystal type shutter of the type described above, when a voltage is applied between the electrodes 4a and 5a, the liquid crystal type shutter R permits transmission of light therethrough but when the voltage disappears, the liquid crystal type shutter R is closed to interrupt the transmission of light therethrough.

Figure 10:
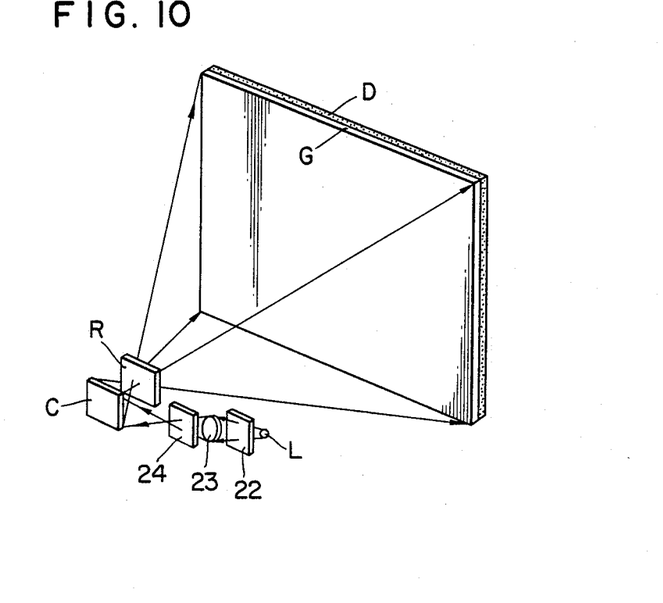
FIG. 10 is a perspective view of one example of primary color light sources in the embodiment shown in FIG. 8.

The light sources $L_1$, $L_2$ and $L_3$ shown in FIG. 8 are those corresponding to three primary colors, respectively, but in practice, instead of giving colors to respective light sources, it is preferable that as shown in FIG. 10, the light from the light source L be transmitted through an infrared cut-off filter 22 for eliminating thermal or heat flux, a lens 23 and a primary color filter 24 to the light control device C. The color filter 24 is of coure colored in red, green or blue.

As shown in FIG. 8, an image scanning signal input device 28 is connected to the liquid crystal image generation device G and three primary color image scanning signals are transmitted from the signal input device 28 to the liquid crystal image generation device G. The input signals from the signal input device 28 are also transmitted to the three primary color switching devices $R_1$, $R_2$ and $R_3$, and one of the liquid crystal type shutter devices which are the elements of the three primary color switching devices $R_1$, $R_2$ and $R_3$ is sequentially opened while the remaining two shutter devices are kept closed. That is, assume that the light sources $L_1$, $L_2$ and $L_3$ are red, green and blue light sources. Then, when red color image scanning signal is applied to the liquid crystal image generation device G, a red color light shutter device $R_1$ is applied with a voltage so that it is opened and consequently the red color light rays are transmitted through the liquid crystal image generation device G toward the display surface D. Same is true for the green and blue color lights. As described above, the operations of the three primary color switching devices are synchronized with the image signal input device.

Thus, the images in three primary color appear on the display surface D in a color sequence process so that a color image is formed.

The advantage of the use of the shutter devices $R_1$, $R_2$ and $R_3$ is that it is not necessary at all to turn on and off the light sources $L_1$, $L_2$ and $L_3$. That is the light sources can be kept turned on continuously so that this arrangement is desirable from the viewpoint of life of the light sources.

The color image forming system with the above-described construction can attain excellent effects, which have not been obtainable heretofore by the prior art devices, because of the light control devices $C_1$, $C_2$ and $C_3$ which can form substantially or completely uniform distribution of luminous fluxes density.

In the case of formation of three primary color images by the color suquence process by means of the prior art system which cannot attain a completely uniform luminous flux density distribution on the display surface, the intensity of illumination on the display surface of each primary color image is not uniform so that the color itself of the color imge formed by the mixture of the three primary color images becomes different from the essential color aimed to obtain by the mixture of the three primary colors. This defect is further enhanced because the distances between the three primary color light sources $L_1$, $L_2$ and $L_3$ and the display surface D are different as shown in FIG. 8. More particularly, when the light control device $C_1$ were not used, the illumination of red light from the light source $L_1$ would be bright on the left side portion of the display surface D and be dim on the right side portion thereof so that the red light would be stronger on the left side of the display surface D. On the other hand, the illumination of the blue light from the light source $L_3$ would be dim on the side of the left portion of the display surface D and be bright on the right side thereof so that the blue light would be stronger on the right side of the display surface D. The above-described problems cannot be solved by the control of light by utilizing conventional reflecting mirror or the like in the prior art system and it is impossible to produce a correct mixed color.

In order to solve the above-described problems, a system can be condisered in which three primary color light sources are disposed on the same optical axis; that is, three primary color filters are rotated in front of a single light source, but this system is not desirable because a mechanism for rotating the color filters must be additionally provided. Furthermore, the illumination distribution on the display surface is still not uniform.

In contrast, the image forming system of the preset invention is so designed and constructed that regardless of the positions of the light sources L1, L2 and L3 in relation to the display surface D, a uniform luminous flux distribution of the light from each light source can be obtained on the display surface D, whereby the above-described problems can be solved.

The embodiment of the present invention is advantageous in that the monochromatic color liquid crystal image generation device G can be utilized even in the color image generation device. Color liquid crystal image generation devices are very complex in construction and expensive because minute three color filters must be provided for respective points corresponding to picture elements. In contrast, according to the embodiment of the present invention, the monochromatic color liquid crystal generation device which is relatively inexpensive can be utilized, and the overall image forming system can be fabricated at less costs.

A further advantage of this embodiment resides in that the time length of opening of the three primary color switching devices; that is, the ratio of time lengths during which the light rays of the respective colors are emitted can be controlled as desired to match the spectral characteristics of the light sources and the color filters and the luminosity factor characteristic.

As described above, this embodiment is simple in construction and equivalent to a slight modification of a monochromatic color liquid crystal television set and can provide a color liquid crystal television set which is excellent in resolution and illumination.

Figure 11:
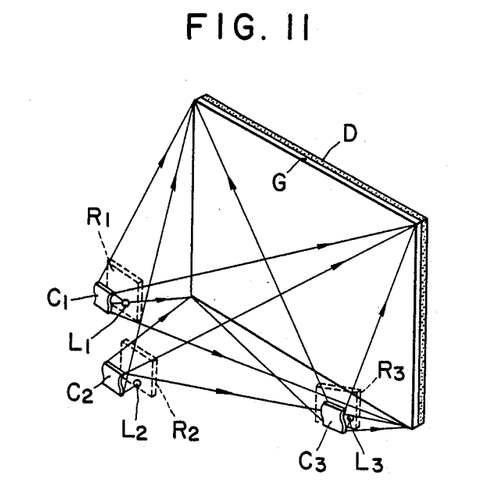
FIG. 11 is a perspective view of a modification of the embodiment shown in FIG. 8.

FIG. 11 demonstrates that the positions of the three light sources $L_1$, $L_2$ and $L_3$ and those of the shutter devices $R_1$, $R_2$ and $R_3$ of the three primary color switching devices in relation to the display surface D can be changed freely. Regardless of the positions of the light sources $L_1$, $L_2$ and $L_3$, each of the light control devices $C_1$, $C_2$ and $C_3$ ensure a uniform luminous flux distribution over the display surface D. In this example, especially the reflecting mirror $C_2$ which is the light control device receives light rays from the light source $L_2$ and reflects them in mutually intersecting state. The light control device can thus be designed in various modes. In like manner, the light control device C shown in FIG. 10 causes the reflected light rays to intersect each other. This design is advantageous in that the shutter device R can be reduced in area.

As described above, because of the use of the light control device, various degrees of freedom in design can be given.

Figure 12:
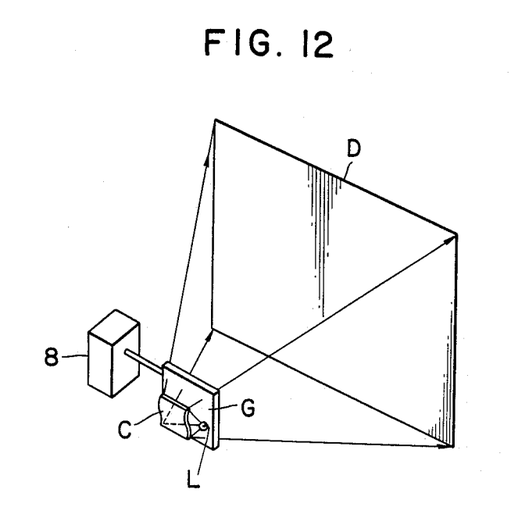
FIG. 12 is a perspective view of another embodiment of a monochromatic color image forming system in accordance with the present invention.

FIG. 12 shows the simplest form of a projection type image forming system in accordance with the present invention. In FIG. 12, D represents a display surface; L, a light source, C, a light control device;l G, an image generation device and 8, an image signal input device. Unlike the above-described embodiments, the image generation device G is not disposed adjacent to the display surface D. The light from the light source L is controlled by the light control device C such as a reflecting mirror and reaches the display surface D with a uniform luminous flux distribution, and the light from the light control device C is transmitted through the image generation device G and projected onto the display surface D, thereby forming an image thereon. This projected image can be viewed from the front side of the display surface D or from the rear side of the same depending upon the type thereof. As the image generation device G, those described in the above embodiments may be used and typically the monochromatic color (or color) liquid crystal image generation device as shown in FIG. 3 is used. As the light control device C, those described with reference to FIGS. 4–7 can be used.

The effects attained by this embodiment are similar to those of the first embodiment described above with reference to FIG. 1, and it has further advantages in that it can be designed without being restricted by the idea that "illumination is in inverse proportion to the square of a distance from a light source" and that it can be designed freely on the premise that the projector unit (the light source, the light control device and the image generation device) is to be placed at a position not interrupting the viewing of the projected image.

Figure 13:
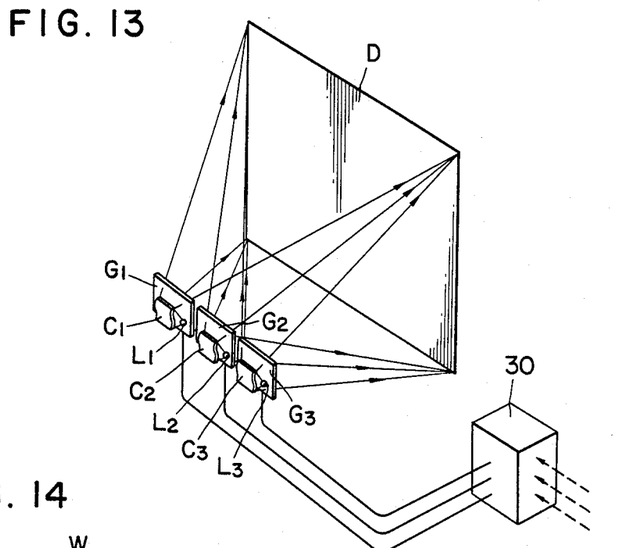
FIG. 13 is a perspective view of a color image forming system based on the underlying principle of the embodiment shown in FIG. 12.

FIG. 13 shows an embodiment in which the underlying principle described above with reference to FIG. 12 is used for the formation of a color image. In FIG. 13, D represents a display surface or screen. In order to project colored lights on the display surface D, three primary color light sources $L_1$, $L_2$ and $L_3$ are provided. They are red, green and blue light sources in the order named from the left to the right. As shown in FIG. 10, each light source comprises, for instance, a light source, an infrared cutoff filter, a lens and a primary color filter. The light control devices $C_1$, $C_2$ and $C_3$ are disposed behind the light sources $L_1$, $L_2$ and $L_3$, respectively. Any of the light control devices described hereinabove may be used as the light control devices. The light control devices $C_1$, $C_2$ and $C_3$ are so designed and constructed as to transmit the lights to the display surface D with a uniform luminous flux distribution, and the image generation devices $G_1$, $G_2$ and $G_3$ are disposed in the light paths, respectively. Each image generation device is a monochromatic color image generation device such as a liquid crystal image generation device. An image signal input device 30 is connected to the image generation devices $G_1$, $G_2$ and $G_3$ so as to synchronously apply three primary color image signals to the image generation devices $G_1$, $G_2$ and $G_3$, respectively. the primary color images from the three image generation devices are superposed one upon another on the display surface D whereby a color image is formed by a color additive process.

Convergence is required in order to form an image on a screen by the additive process. That is, corresponding picture elements of respective primary color images must be projected exactly at the same point on the screen. So far it is most complicated and cumbersome to attain the convergence.

In the prior art systems, it is theoretically impossible to attain a perfect convergence without the use of a means for analyzing a deviation of the position and feeding it back. Especially when the conventional lenses are used in an optical system, the so-called aberrations occur around the optical axis so that when a plurality of primary color images having different optical axes are projected onto the screen, it is fundamentally impossible to attain a perfect convergence even when a degree of precision of each part is improved as practically as possible. Deviations between the respective images are further enhanced when the screen is enlarged in size and the distance to the screen is shortened.

This embodiment of the present invention provides a construction which can substantially solve the above-described problems and which is so simple that no adjustment and correction are needed.

Figure 14:
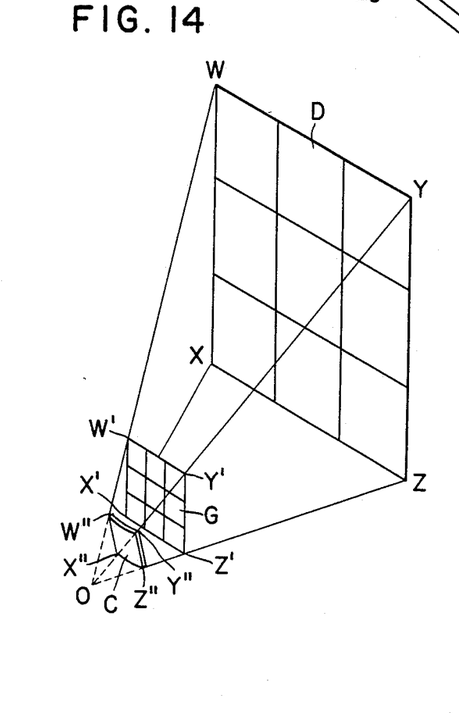
FIG. 14 is a view illustrating the relationship between the image on the display surface and the image of the image generation device.

In this connection, the correlation between the image on the display surface (screen) D and the image generated by the image generation device G will be considered with reference to FIG. 14. In the conventional projection device, the image projected on the display surface (screen) D and the image generated by the image generation device become similar figures only when the extensions of the lines connecting the points W, X, Y and Z on the display surface, the points W', X', Y' and Z' on the image generation device and the points W''', X''', Y''' and Z''' on the reflecting mirror of the light control device C; that is, the extensions of the lines WW'W''', XX'X''', YY'Y''' and ZZ'Z''' converge at a point O and only when the surfaces defined by the points W, X, Y and Z and by the points W', X', Y' and Z' are in parallel with each other. However, according to the present invention wherein the light control device is used, the above-described conditions need not be satisfied. For instance, when the light rays from the light control devices intersect before they reach the display surface, a similarity principle is not held. In spite of this, each point of the image on the display surface and each point of a dot (light quantity varying element portion E) of the image generated by the image generation device have a distinct relation. This is determined by a luminous flux analysis function of the light control device.

Referring back to FIG. 13, since the distances between the light control devices and the image generation devices and the directions of the image generation devices are different, three image generation devices in which the arrangements of dots corresponding to the picture elements on the display surface are completely different from each other are required in order to attain a complete convergence.

It may appear that the image forming devices become complicated in construction because of the requirement of the three different image generation devices. However, the arrangement of dots in each image forming device is determined solely by the luminous flux control analysis function so that the dot arrangement can be given very easily by a computer.

As described above, according to the features of the present invention, relations obtained as a result of the luminous flux control analysis are incorporated in the arrangement or pattern of dots (light quantity varying element portions) of the image generation device and the configuration of the light control device for each of three primary colors, and no similarity relationship exists between the image on the display surface and the dot patterns generated by the image generation devices.

According to the prior art devices, the problem of convergence is taken into consideration after each image generation device is designed to generate an image similar to the image to be displayed on the display surface, but according to the present invention, when the image forming devices are designed based on the luminous flux control analysis function, the convergence can be attained naturally.

When the lens having a special configuration as shown in FIG. 6 is used as the light control device, a color aberration problem arises, but since each lens is used to transmit a monochromatic light, almost no problem arises.

Figure 15:
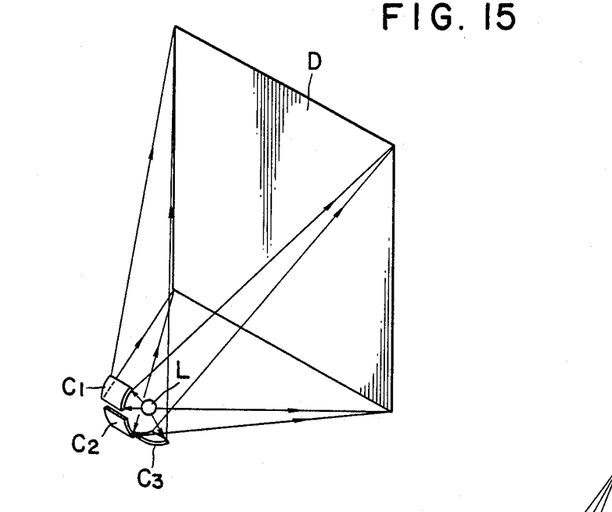
FIG. 15 is a perspective view of a modification of the embodiment shown in FIG. 13.
Figure 16:
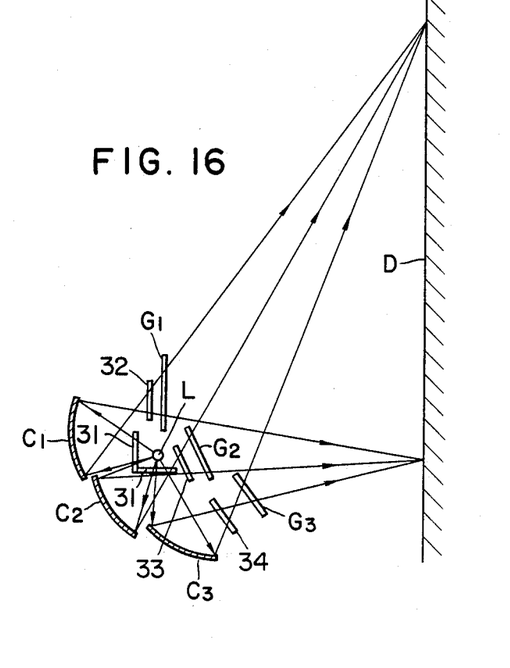
FIG. 16 is a side view thereof.

FIGS. 15 and 16 show a modification of the embodiment described above with reference to FIG. 13. In this embodiment, only one light source L is provided and the light emitted therefrom is transmitted through an infrared cutoff filter 31 to the light control devices $C_1$, $C_2$ and $C_3$. Thereafter, the lights whose luminous flux distributions are adjusted by the light control devices are transmitted through three primary color filters 32, 33 and 34 and the image generation devices $G_1$, $G_2$ and $G_3$ to the display surface D. In FIG. 15, some component parts are not shown for clarity. In this modification, the light rays from the light control devices $C_1$, $C_2$ and $C_3$ converge and intersect and then are directed toward the display surface.

In the above-described embodiments, the display surface D is planar and the image generation devices are also planar while the light control devices C have such a configuration that a uniform luminous flux distribution can be obtained on the display surface D. However, it will be apparent that the present invention can be applied equally to a line obtained as a result of the maximum shortening of one width of the display surface. In this case, the light control device is so designed and constructed to obtain a bright line having a uniform luminous distribution in the longitudinal direction and the image generation device G is in the form of a rod or a plate having an extremely narrow width. The light control device for forming the bright line is so designed that in the examples as shown in FIGS. 4-7, a luminous flux is polarized in a direction at an angle relative to the surface of FIGS. 4-7 so that the luminous flux intersects a line on the display surface. In the above described embodiments, the luminous flux distribution is made uniform, but depending upon the shape of a display surface or screen, a non-uniform luminous flux distribution may be produced purposely so as to obtain an optimum state.

As described above, according to the present invention, there is provided an image forming system whose illumination is uniform, which can be installed advantageously and can obtain exact color with excellent convergence in the case of the formation of a color image and which is simple in construction.

INDUSTRIAL APPLICABILITY

The underlying principle of the present invention can be applied to monochromatic color display devices, color display devices, television sets and so on for producing moving or still images.

What is claimed is:

1. An image forming system comprising: display surface means, a light source disposed in spaced apart relationship with said display surface means, light control means disposed in the light path to control light rays from said light source in such a manner as to cause the light rays to be transmitted with a uniform distribution of luminous flux density throughout the cross section of the light rays to said display surface means, and image generation means interposed between said light control means and said display surface means and having elemental portions for varying the quantity of light to be transmitted therethrough, said elemental portions corresponding to respective picture elements of an image to be formed on the display surface means, each elemental portion controlling the quantity of light to be transmitted independently of each other in response to a signal.

2. An image forming system as set forth in claim 1 wherein said image generation means is a liquid crystal image generation device and said display surface means is a light diffusion surface formed on the side opposite to the side at which the light reaches said image generation means.

3. An image forming system as set forth in claim 1 wherein said light control means includes a reflecting mirror for reflecting the light from said light source.

4. An image forming system as set forth in claim 1 wherein said light control means includes a Fresnel plate through which the light from said light source is transmitted.

5. An image forming system as set foth in claim 1 wherein said light control means includes a lens through which the light from said light source is transmitted.

6. An image forming system comprising: display surface means, three red, blue and green primary color light sources disposed in spaced apart relationship with said display surface means, light control means disposed in respective light paths from said light sources for controlling the light rays from said light sources in such a manner as to cause the light rays to reach said display surface means with a uniform distribution of luminous flux density throughout the cross section of the light rays, image generation means disposed adjacent to the side facing the light sources of said display surface means and having elemental portions for varying the quantity of light to be transmitted therethrough, the elemental portions corresponding to respective picture elements of an image to be formed on the display surface means, three primary color switching means for transmitting sequentially with a time difference light rays from said three primary color light sources to said respective image generation means, image signal input means for sequentially transmitting with a time difference three primary color image signals to said elemental portions of said imge generation means, thereby controlling the quantity of the light to be transmitted through each elemental portion, and synchronizing means for carrying out synchronization between said three primary color switching means and said image signal input means with respect to color.

7. An image forming system as set forth in claim 6 wherein said image generation means is a liquid crystal image generation device.

8. An image forming system as set forth in claim 6 wherein said three primary color switching means are liquid crystal shutter means.

9. An image forming system comprising: display surface means, three red, blue and green primary color light sources disposed in spaced apart relationship with said display surface means, light control means in respective light paths from said light sources for controlling the light rays from said light source in such a manner as to cause the light rays to reach the display surface means with a uniform distribution of luminous flux density throughout the cross section of the light rays, three image generation means interposed between the light control device of each light source and said display surface means and having elemental portions for varying the quantity of light to be transmitted therethrough, the elemental portions corresponding to respective picture elements of an image to be formed on the display surface means, said image generation means being disposed to cause the images generated thereby to be superposed on said display surface means, and image signal input means connected to said image generation means for applying thereto three primary color image signals synchronously and independently of each other.

10. An image forming system as set forth in claim 9 wherein said image generation means are liquid crystal image generation devices.

* * * * *